United States Patent
Chida et al.

(10) Patent No.: US 9,662,744 B2
(45) Date of Patent: May 30, 2017

(54) LASER IRRADIATION DEVICE AND METHOD OF DIAGNOSING THE HEALTH OF A LASER IRRADIATION HEAD

(71) Applicant: Kabushiki Kaisha Toshiba, Minato-ku (JP)

(72) Inventors: Itaru Chida, Kanagawa-ken (JP); Katsunori Shiihara, Kanagawa-ken (JP); Yasuaki Tokunaga, Kanagawa-ken (JP); Takeshi Maehara, Kanagawa-ken (JP); Keiichi Hirota, Kanagawa-ken (JP); Hiroya Ichikawa, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 403 days.

(21) Appl. No.: 14/254,184

(22) Filed: Apr. 16, 2014

(65) Prior Publication Data

US 2014/0224780 A1     Aug. 14, 2014

Related U.S. Application Data

(63) Continuation of application No. PCT/JP2012/006628, filed on Oct. 17, 2012.

(30) Foreign Application Priority Data

Oct. 17, 2011   (JP) ................. 2011-228002

(51) Int. Cl.
*B23K 26/03*   (2006.01)
*B23K 26/70*   (2014.01)

(52) U.S. Cl.
CPC .......... *B23K 26/032* (2013.01); *B23K 26/707* (2015.10)

(58) Field of Classification Search
CPC ... B23K 26/032; B23K 26/426; B23K 26/707
(Continued)

(56) References Cited

U.S. PATENT DOCUMENTS

| | | | | |
|---|---|---|---|---|
| 5,449,882 A | * | 9/1995 | Black | B23K 26/032 219/121.74 |
| 5,463,202 A | * | 10/1995 | Kurosawa | B23K 26/032 219/121.62 |

(Continued)

FOREIGN PATENT DOCUMENTS

| | | |
|---|---|---|
| EP | 0 212 786 A1 | 3/1987 |
| EP | 1 457 286 A2 | 9/2004 |

(Continued)

OTHER PUBLICATIONS

Extended Search Report issued Nov. 16, 2015 in European Patent Application No. 12842462.9.

(Continued)

*Primary Examiner* — Thien S Tran
(74) *Attorney, Agent, or Firm* — Oblon, McClelland, Maier & Neustadt, L.L.P.

(57) ABSTRACT

A laser irradiation device in which laser light is adjusted to create a laser beam, including a protective glass window arranged in an emission region that emits the laser beam; a reflection mechanism that passes the laser beam and reflects visible light; a wavelength-dependent optical screening mechanism that cuts off light of a wavelength region other than visible light from the light that is reflected by the reflection mechanism; image pickup camera configured to capture the visible light reflected with the reflection optical element; and an image adjustment lens unit that adjusts an image in the visible light that is input from the wavelength-dependent optical screening mechanism. The wavelength- (Continued)

dependent optical screening mechanism is provided between the reflection optical element and the image camera.

6 Claims, 4 Drawing Sheets

(58) Field of Classification Search
USPC .............. 219/121.9, 121.63, 121.67, 121.68, 219/121.73, 121.77, 121.83
See application file for complete search history.

(56) References Cited

U.S. PATENT DOCUMENTS

| | | | |
|---|---|---|---|
| 5,486,677 A * | 1/1996 | Maischner | B23K 26/032 |
| | | | 219/121.83 |
| 2010/0276403 A1* | 11/2010 | Reitemeyer | B23K 26/046 |
| | | | 219/121.67 |

FOREIGN PATENT DOCUMENTS

| | | | | |
|---|---|---|---|---|
| EP | 1 457 286 A3 | | 9/2004 | |
| EP | 1457286 A2 | * | 9/2004 | ............. B23K 26/03 |
| JP | 7-16795 B2 | | 3/1995 | |
| JP | 9-57479 | | 3/1997 | |
| JP | 09-057479 A | | 3/1997 | |
| JP | 09-057479 | * | 4/1997 | |
| JP | 09-199845 A | | 7/1997 | |
| JP | 2004-337875 A | | 12/2004 | |
| JP | 2004337875 A | * | 12/2004 | |
| JP | 3752112 B2 | | 3/2006 | |
| JP | 2009-28742 A | | 2/2009 | |
| JP | 2010-240674 A | | 10/2010 | |
| JP | 2010240674 A | * | 10/2010 | |
| KR | 10-2005-0108702 A | | 11/2005 | |
| KR | 10-2009-0012106 A | | 2/2009 | |

OTHER PUBLICATIONS

Korean Office Action issued Nov. 23, 2015 in Patent Application No. 10-2014-7009988 (without English Translation).
Office Action issued Apr. 7, 2015 in Korean Patent Application No. 10-2014-7009988.
International Search Report issued on Jan. 22, 2013 for PCT/JP2012/006628 filed on Oct. 17, 2012 with English Translation.
Office Action issued Jun. 7, 2016 in Japanese Patent Application No. 2012-229917.

* cited by examiner

LASER IRRADIATION DEVICE AND METHOD OF DIAGNOSING THE HEALTH OF A LASER IRRADIATION HEAD

CROSS REFERENCE TO RELATED APPLICATION

This is a Continuation of PCT Application No. PCT/JP2012/006628, filed on Oct. 17, 2012, which is based upon and claims the benefit of priority from the prior Japanese Patent Application No. 2011-228002, filed on Oct. 17, 2011, the entire contents of which are incorporated herein by reference.

FIELD

An embodiment of the present invention relates to a laser irradiation device and a method of diagnosing the health of a laser irradiation head.

BACKGROUND

Laser processing is a method of performing surface modification such as welding, cutting, or laser peening or tempering (or quenching) of a region to be processed by directing a laser beam emitted from a laser oscillator onto the surface of the region to be processed, through an optical system comprising for example a lens or mirror provided in a laser irradiation head. The absorption rate of the laser beam varies depending on the material of the region to be processed and the type of laser oscillator employed, and various kinds of processing can be performed, depending on differences in laser output etc. For example, for laser welding or cutting, a YAG laser, $CO_2$ laser or fiber laser or the like of high output in the several-kW class may be employed, and the quality of the laser-processed region may be varied by employing different laser waveforms, as a continuous wave or pulse.

In the case of laser welding, clad welding is performed using filler metal (or welding material). For example, in an atomic power plant, when repairing locations where stress corrosion cracking has occurred or locations where such cracking may occur, clad welding is performed using metal filler of superior stress corrosion cracking resistance. In this way, occurrence of stress corrosion cracking in locations where weld repair has been performed can be prevented. Also, isolation of reactor water can be achieved and leakage of reactor water to the exterior can be prevented by sealing cracks by clad welding using filler metal with respect to locations where stress corrosion cracking has already occurred.

When performing laser welding, metal evaporation or sputtering (sputter), termed fumes, are generated from the region that is being processed. A protective glass window is therefore provided, to ensure that such fumes or sputtering (sputter) do not enter the optical system within the laser irradiation head, or the laser processing is performed while spraying processing gas.

In laser welding, a known technique for guaranteeing quality of the region that is being welded is the technique of using a monitoring device to display the laser processing condition in the form of an image (see for example patent reference 1). With this technique, the laser processing condition is controlled by performing image recognition of the positional information of the weld pool or groove formed when the laser beam is directed onto the surface of the region to be processed: in this way, a welding region of stable quality can be formed. Such a technique is disclosed in Japanese issued patent number 3752112 (hereinafter referred to as patent reference 1).

In laser processing, deposition (or adhesion) of fumes or sputter generated during the laser processing on the protective glass screen or lens or the like of the laser irradiation head impairs the health of the laser irradiation head and may cause lowering of the laser power that irradiates the surface of the region to be processed. Although a conventional monitoring device as described above makes it possible to evaluate the quality of the welded region, it is still not possible to confirm the health of the laser irradiation head. Also, in confirming the health of the laser irradiation head, the only method available is to disassemble the laser irradiation head: thus time is required for the inspection and there is also the problem that, if a need for reprocessing is found, it is not possible to conclude to what point such reprocessing should return.

The present invention was made in order to deal with these circumstances, its object being to provide a laser irradiation device and a health diagnosis method of a laser irradiation head whereby it is possible to confirm health of a laser irradiation head without difficulty, without disassembling the laser irradiation head.

A laser irradiation device having a laser oscillator that generates a laser beam;

a laser irradiation head that performs laser processing by directing a laser beam generated by said laser oscillator onto a region to be processed; and a transmission mechanism that gets said laser beam through emitted from said laser oscillator to said laser irradiation head, wherein said laser irradiation head comprises:

a protective glass window arranged in an emission region that emits said laser beam of said irradiation head onto said region to be processed;

a reflection mechanism, provided within said irradiation head, that gets said laser beam through and reflects at least visible light, of reflected lights from said region to be processed;

an image pickup camera that inputs light reflected by said reflection mechanism; and an image adjustment optical system, provided between said reflection mechanism and said image pickup camera, whereby a focal point position of said image pickup camera can be changed over to the position of at least said protective glass window and said region to be processed.

A method of diagnosing the health of a laser irradiation head, there being provided:

a laser oscillator that generates a laser beam;

a laser irradiation head that performs laser processing by directing a laser beam generated from said laser oscillator onto a region to be processed; and a transmission mechanism that gets said laser beam through generated from said laser oscillator to said laser irradiation head; and said laser irradiation head comprises:

a laser beam adjustment unit that produces a laser beam directed onto said region to be processed by adjusting said laser beam from said transmission mechanism; and a protective glass window arranged in an emission section that emits a laser beam; and wherein a health of said laser irradiation head of said laser irradiation device is diagnosed;

there are arranged in said laser irradiation head:

a reflection mechanism provided within said irradiation head, that gets said laser beam through and that reflects at least visible light of reflected lights from said region to be processed;

an image pickup camera that inputs said light reflected by said reflection mechanism; and an image adjustment optical system provided between said reflection mechanism and said image pickup camera, capable of changing over a focal point position of said image pickup camera to at least a position of said protective glass window and said region to be processed; and said health of said laser irradiation head is diagnosed using an image picked up by said image pickup camera.

With the present invention, the health of the laser irradiation head can be confirmed without difficulty, without disassembling the laser irradiation head.

DETAILED DESCRIPTION

Embodiments of the invention are described below with reference to the drawings.

Figure 1:
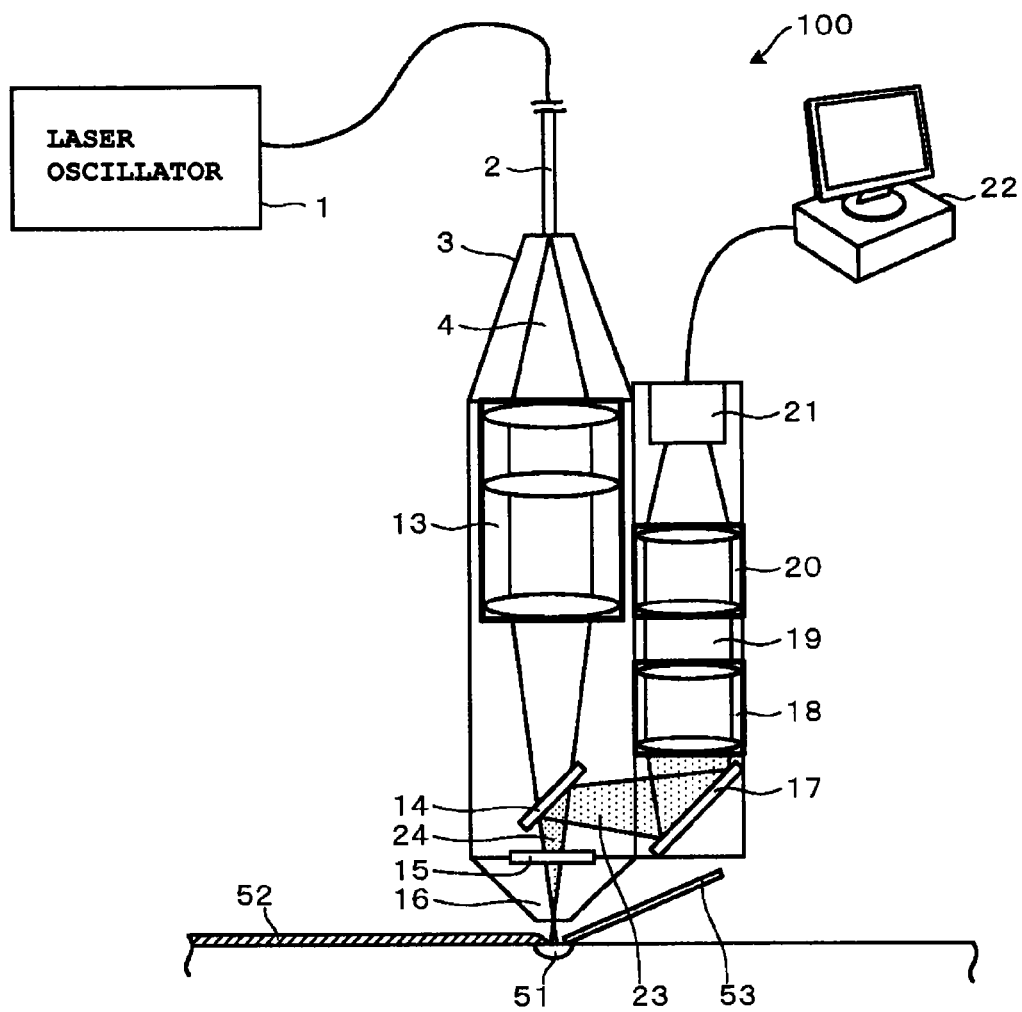
FIG. 1 is a view showing diagrammatically the layout of major parts of a laser irradiation device according to a first embodiment.

FIG. 1 is a view showing diagrammatically the layout of major parts of a laser irradiation device according to a first embodiment. A laser irradiation device 100 comprises a laser oscillator 1, an optical fiber 2 constituting laser beam transmission means, and a laser irradiation head 3: the laser beam 4 generated by the laser oscillator 1 is directed into the laser irradiation head 3 by transmission using the optical fiber 2.

Within the laser irradiation head 3, there are arranged, in order from the rear end side (upper side in FIG. 1), a laser beam adjustment unit 13 and a dichroic mirror 14: a protective glass window 15 is arranged in the region of the laser irradiation head 3 where the laser beam 4 is emitted. Also, a nozzle 16 is arranged in a portion at the leading end side (lower side in FIG. 1) of the protective glass window 15. The dichroic mirror 14 has the function of a reflection mechanism that, of the input light, gets the laser beam through the laser beam but reflects visible light.

Also, at the side of the dichroic mirror 14, there is arranged a reflective mirror 17 that reflects light that is reflected by the dichroic mirror 14; a wavelength-dependent screening mechanism 18, an image adjustment lens unit 20, and a CCD (Charge-Coupled Device) camera 21 are arranged so as to be positioned on the optical path of the light reflected by the reflective mirror 17. In addition, an image processing mechanism 22 comprising for example a computer and a display is connected with the CCD camera 21.

The laser beam that is got through as far as the laser irradiation head 3 by the optical fiber 2 is directed into the laser beam adjustment unit 13 in the laser irradiation head 3. The laser beam that is emitted from the optical fiber 2 spreads out during propagation in accordance with the incidence aperture number to the optical fiber 2, so the laser beam 4 is adjusted by the laser beam adjustment unit 13, which comprises for example a plurality of lenses, to the necessary size for transmission as a parallel beam and is focused onto the point to be processed. The laser beam 4 emitted from the laser beam adjustment unit 13 is directed onto the surface of the region to be processed while being gathered or focused, through the dichroic mirror 14, protective glass window 15 and nozzle 16. The laser beam 4 is thus focused to constitute a prescribed laser beam appropriate for laser processing at the time point of its incidence on the surface of the region to be processed.

At the surface of the region to be processed that is irradiated by the laser beam 4, a melt pool 51 is formed in accordance with the focused spot diameter of the laser beam 4, the laser output and the material of the region to be processed etc. A weld bead 52 can thus be formed by moving the laser irradiation head while supplying for example filler wire 53 to the melt pool.

Accompanying the formation of the melt pool 51, fumes and sputter are scattered from the surface of the region to be processed that is irradiated by the laser beam 4. Usually laser processing is performed whilst injecting a shielding gas, not shown, from the tip of a nozzle 16, so the likelihood of fumes or sputter being deposited on the surface of the protective glass shield 15 is low. Conventionally, however, it was not possible to confirm whether or not fumes or sputter were in fact deposited on the surface of the protective glass window 15 without disassembling the laser irradiation head 3.

In contrast, in the case of the laser irradiation device 100 of this first embodiment, visible light is reflected by the dichroic mirror 14 that is arranged within the laser irradiation head 3 and this visible light is picked up by the CCD camera 21 after passing through the reflecting mirror 17, wavelength-dependent screening mechanism 18 and image adjustment lens unit 20: the image that is thus picked up is then processed by the image processing mechanism 22. Consequently, the image of the vicinity of the melt pool 51 and the image of the surface of the protective glass window 15 can be checked.

Light 24 including the laser beam produced at the surface of the region to be processed by reflection of the irradiated laser beam 4 from the vicinity of the melt pool 51 on the surface of the region to be processed, visible light and a noise component generated from the metallic plasma (i.e. laser beam+visible light+noise) is obtained as image information: at the dichroic mirror 14, of these, chiefly only the visible light component is reflected.

However, since the dichroic mirror 14 is formed with a film by coating, it cannot reflect 100% of the visible light, and the noise component etc. of the infrared light region from the plasma generated during laser welding is also reflected by the dichroic mirror 14. Consequently, if the reflected light 23 (visible light+noise) from the dichroic mirror 14 were directly introduced into the CCD camera, it would not be possible to obtain the required image information, due to the effect of noise.

In the case of the laser irradiation device 100 according to this first embodiment, the reflected light (visible light+noise) 23 from the dichroic mirror 14 is introduced into the wavelength-dependent screening mechanism 18 that is arranged in the laser irradiation head 3, the noise component is thereby removed, and visible light 19 with no noise component is thus obtained.

If for example a color filter is employed in the wavelength-dependent screening mechanism 18, for example wavelength components longer than infrared can be removed, making it possible to obtain exclusively visible light 19 as the image information. Also, if this is combined with use of an ultraviolet region color filter, noise components of wavelength in the ultraviolet region can be removed. Furthermore, by combining with a polarizing filter or neutral density filter or the like, image information can be obtained from which for example halation is removed.

Figure 3A:
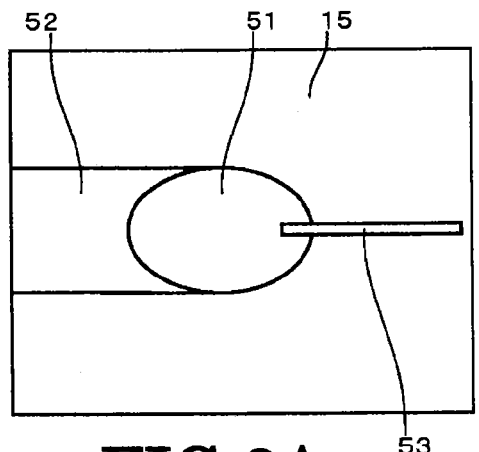
FIG. 3A, FIG. 3B, FIG. 3C, FIG. 3D and FIG. 3E are views showing diagrammatically an example of image information.

The visible light 19 from which the noise components have been removed as described above by the wavelength-dependent screening mechanism 18 passes through the image adjustment lens unit 20 and is picked up by the CCD camera 21. The image adjustment lens unit 20 comprises a mechanism capable of altering the focal point position by moving the lens position and, for example as shown in FIG. 3A, can check the condition at the location where the wire filler 53 is supplied to the weld pool 51 and welding is effected or can check the condition of the surface of the protective glass window 15 as shown in FIG. 3B by changing over the focal point position to obtain an image of a position in which the focal point is matched therewith. Also, the image adjustment lens unit 20 is provided with a viewing field angle alteration mechanism (zoom mechanism).

As mentioned above, the image processing mechanism 22 comprises for example a computer and a display. This image processing mechanism 22 is equipped with means for storing the image information obtained and comparison means for comparing the image information stored in this storage means with for example image information obtained in real time.

Describing the example of laser welding, initial image information in a healthy condition, as shown in FIG. 3A and FIG. 3B, is stored in the storage means as information at the start of welding. FIG. 3A shows diagrammatically the condition in which the focal point position is matched with the welding location and FIG. 3B shows diagrammatically the condition in which the focal point is matched with the surface of the protective glass window 15. In FIG. 3B, welding beads 52 etc. are visible, to a reduced scale, beyond the protective glass window 15.

If, subsequently, arrangements are made, after the lapse of some time from commencement of laser welding, to periodically store the image information in the storage means and to compare this image information by using the comparison means, it is possible to check whether or not laser welding is being implemented in a healthy condition, without such inconveniences as damage to the optical system of the laser irradiation head 3.

Figure 3C:
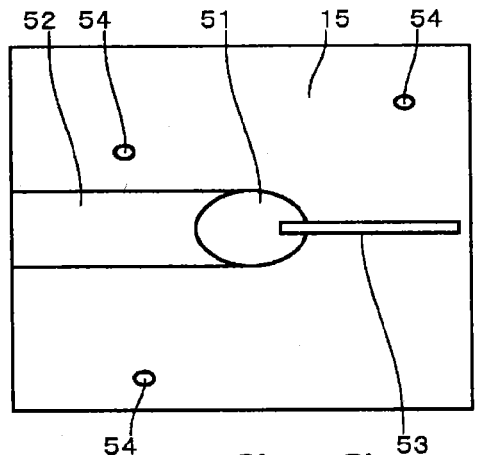
Figure 3B:
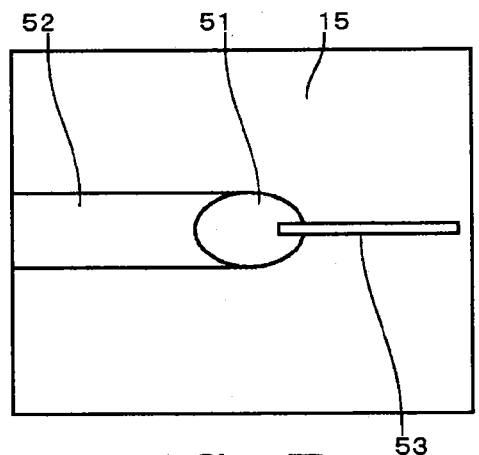
Figure 3D:
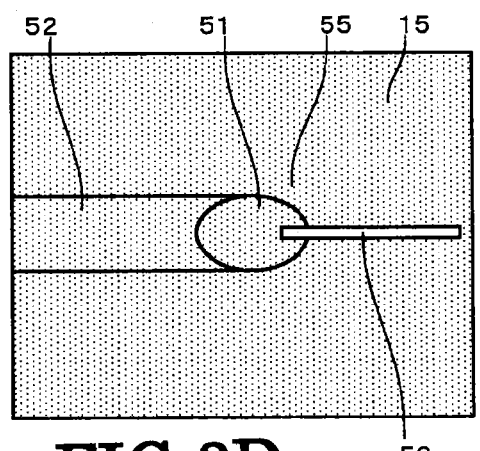

Supposing for the moment that such damage has occurred, for example, as shown in FIG. 3C, that sputter 54 has been deposited on part of the surface of the protective glass window 15, or, for example as shown in FIG. 3D, that fumes 55 have been deposited on the surface of the protective glass window 15 (resulting in the entire image becoming cloudy), or the like conditions, this can be confirmed by using the image information.

Figure 3E:
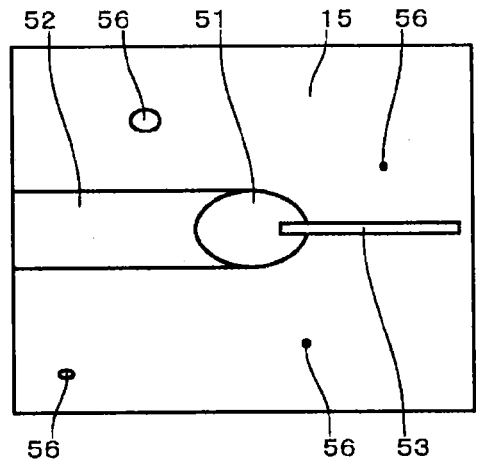

Also, as in the case of welding in water, in a method in which welding is performed while spraying shielding gas from the tip of a nozzle 16 with the laser irradiation head 3 shown in FIG. 1 inserted in the water, if disruption of the condition of spraying of the shielding gas occurs, as shown in FIG. 3E, resulting in a condition in which water droplets 56 have been deposited on the surface of the protective glass window 15, this can be identified.

Specifically, for example the image information in a healthy condition of the laser irradiation head 3 stored in the image processing mechanism 22 and the image information after laser processing can be compared and a diagnosis of health can be performed using the deviation obtained as a result of such comparisons. In this case, if for example more than a prescribed reference value of sputter has been deposited on the protective glass window 15, the conclusion may be drawn for example that the health of the screen has been damaged. Also, by using the image processing mechanism 22 to detect the amount of light, a determination of health can be performed based on the difference in the amount of light between the amount of light when the laser irradiation head 3 is healthy, prior to laser processing and the amount of light after laser processing. In this case, if for example the amount of light has decreased due to deposition of fumes on the surface of the protective glass window 15, so that the difference in the amount of light is more than a prescribed reference value, it can be concluded for example that the health of the laser irradiation head has been impaired.

As described above, by using the wavelength-dependent screening mechanism 18 to remove wavelength components constituting noise from the reflected light (visible light+noise) 23 including noise components reflected by the dichroic mirror 14, and using the image adjustment lens unit 20 to change over the focal point position, the image may be checked by the image processing mechanism 22 while changing over the observation position: in this way, laser processing can be performed while checking the health of the laser irradiation head 3 itself.

Also, owing to the adoption of a construction wherein reflected light from the surface of the region to be processed is branched by the dichroic mirror 14 in the laser welding head 3 before being input to the CCD camera 21, there is no need to make the construction of the parts of the laser welding head 3 facing the region to be processed complicated or large in size.

Also, since, of the reflected light from the surface of the region to be processed, the reflected light that enters the optical path of the laser beam 3 is picked up, the protective glass window 15 etc. can be checked reliably, so long as it is in a condition in which processing can be achieved. It may be envisioned that if for example a construction were adopted in which an image of the protective glass window was picked up with the CCD camera etc. being provided on the side of the nozzle 16 of the protective glass window 15, fumes or sputter penetrating between the protective glass window 15 and this CCD camera could interfere with image pickup.

It should be noted that, although, in this embodiment, the description was given assuming that the dichroic mirror 14 was provided between the laser beam adjustment unit 13 and the protective glass window 15, there is no restriction to this. So long as the reflected light that is directed onto the protective glass window 15 from the optical path of the laser beam is branched before entering the CCD camera 21, the dichroic mirror could be provided for example between the laser beam adjustment unit 13 and the optical fiber 2. Alternatively, if the transmission distance of the laser beam is long, a plurality of optical fibers 2 may be connected by an optical repeater; however, a construction can be adopted in which the reflected light is branched in this optical repeater.

Although, in the above description, laser welding was described by way of example, there is no restriction to laser welding and it would be possible to apply the foregoing to laser processing in general, such as laser cutting or laser peening.

Next, a second embodiment will be described with reference to FIG. 2.

Figure 2:
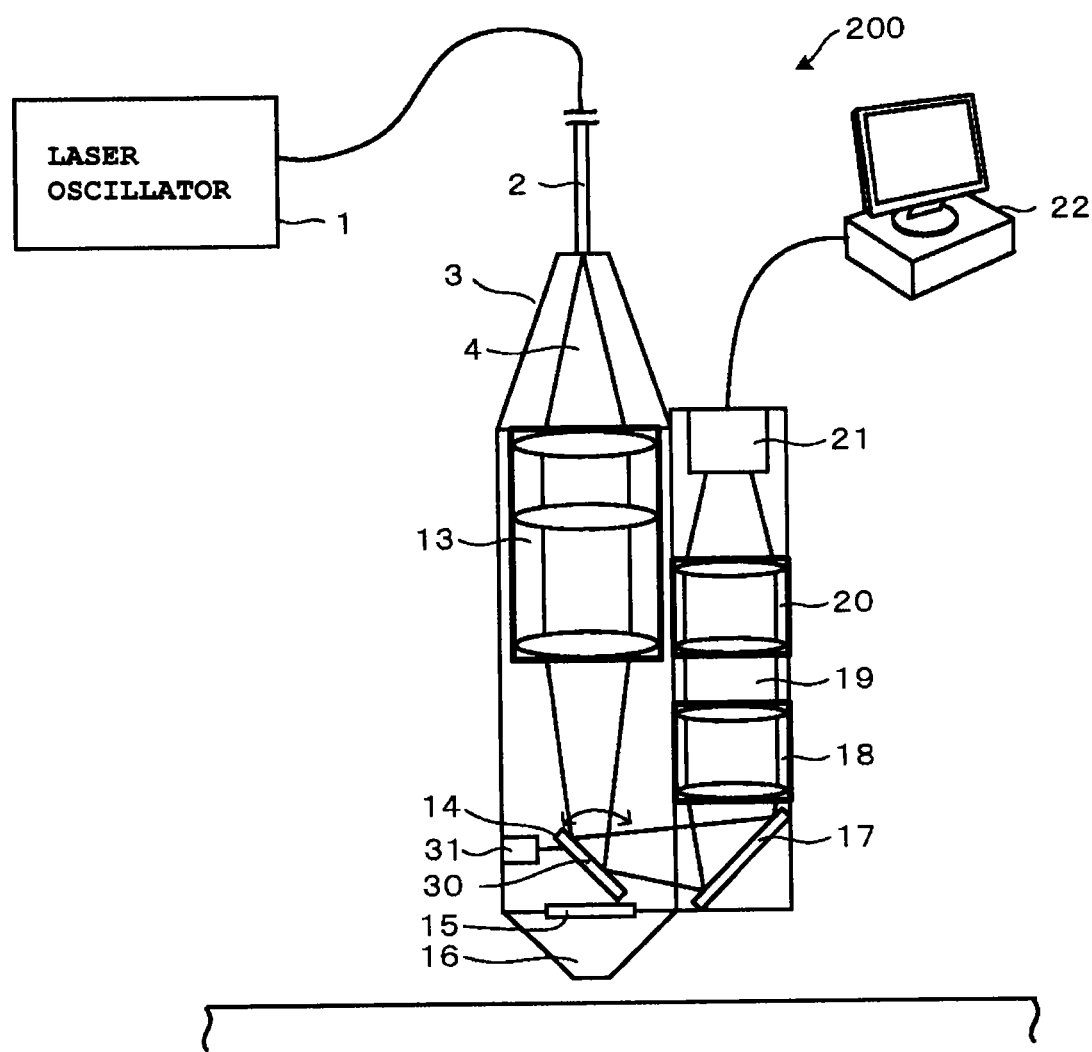
FIG. 2 is a view showing diagrammatically the layout of major parts of a laser irradiation device according to a second embodiment.

FIG. 2 is a view showing diagrammatically the layout of major parts of a laser irradiation device 200 according to a second embodiment. In this laser irradiation device 200, a dichroic mirror 14 that is arranged within the laser irradiation head 3 comprises a drive mechanism 31; as shown in FIG. 1, the position of the dichroic mirror 14 can be set at a position to reflect the visible light that is incident from the side of the protective glass window 15 or a position to reflect the visible light that is incident from the side of the laser beam adjustment unit 13, as shown in FIG. 2.

Specifically, as shown by the arrows in FIG. 2, the dichroic mirror 14 is capable of rotation about a rotation axis 30 by a drive mechanism 31. The dichroic mirror 14 can thus be set in a position in which as shown in FIG. 1, image information is obtained by input of visible light directed from the side of the protective glass window 15 to the CCD camera 21 after reflection by the dichroic mirror 14, through the reflective mirror 17, optical wavelength-dependent screening mechanism 18, and image adjustment lens unit 20, and a position in which as shown in FIG. 2 image information is obtained by input of visible light directed from the side of the laser beam adjustment unit 13 to the CCD camera 21 after reflection, through the reflecting mirror 17, optical wavelength-dependent screening mechanism 18, and image adjustment lens unit 20. Other parts which have the same construction as in the case of the first embodiment shown in FIG. 1 are given the same reference numerals as the corresponding parts, to avoid repetition of description.

The position of the dichroic mirror 14 shown in FIG. 1 is a position at which image information of the laser processing region during for example laser processing or image information of the surface of the protective glass window 15 is obtained; the position of the dichroic mirror 14 shown in FIG. 2 is a position in which image information of the internal optical system within the laser irradiation head 3 is obtained when laser processing is not performed.

As shown in FIG. 2, although laser processing cannot be performed by directing the visible light reflecting face of the dichroic mirror 14 towards the side of the laser beam adjustment unit 13, the condition of the optical system of the laser beam adjustment unit 13 and, through this optical system, the condition of the end of the optical fiber 2 can be viewed, so it is possible to check whether or not any damage to these has taken place. In this case also, a check is performed on the condition of the lens within the laser beam adjustment unit 13 and the condition of the end of the optical fiber 2 by employing the focal point position changeover function of the image adjustment lens unit 20.

Figure 4A:
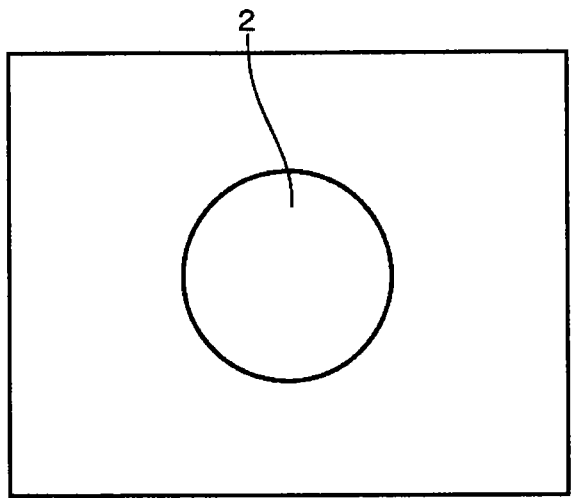
FIG. 4A and FIG. 4B are views showing diagrammatically an example of image information.

In particular, when the condition of the end of the optical fiber 2 is to be checked, the diameter of the end of the optical fiber 2 is smaller than for example the diameter of the internal lens of the laser beam adjustment unit 13, so a field of view angle alteration mechanism (zoom mechanism) of the image adjustment lens unit 20 is employed: it is thereby possible for example to obtain image information in a condition in which the end of the optical fiber 2 is magnified, as shown in FIG. 4A.

Figure 4B:
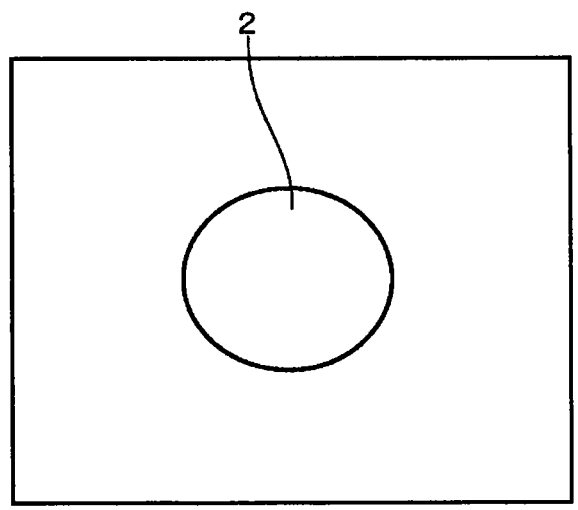

If damage has occurred to the end face of the optical fiber 2, for example if melting has occurred at the end face of the optical fiber 2, the end face of the optical fiber 2 will have assumed a built-up condition, so, as shown in FIG. 4B, an image will be obtained that is different from the circular image in the normal case shown in FIG. 4A, and this can be identified. (The example shown in FIG. 4B shows an elliptical shape. In fact, because of distortion of the end face of the optical fiber 2, the shape is more distorted.)

An image obtained in the case where the optical fiber 2 etc is normal, prior to commencement of laser processing, as shown in FIG. 4A is recorded in the storage section of the image processing mechanism 22: it is thus possible to perform laser processing with the laser irradiation head 3 in a healthy condition, if the end face of the optical fiber 2 and the internal optical system of the laser beam adjustment unit 13 are periodically checked.

It should be noted that, when the optical system within the laser irradiation head 3 is observed, if observation of the optical system in the interior is conducted while delivering from the laser oscillator 1 a laser beam of lower output (for example of around a few mW to 100 W) than when laser processing is performed, it becomes easier to check the condition of the optical system in the interior than if this is done while performing irradiation with a laser beam. Also, the surface of the lens constituting the laser beam adjustment unit 13 is coated with a reflection preventing film, and this reflection preventing film emits light when irradiated with a laser beam.

By periodically observing the interior of the laser irradiation head 3 in this way, it is possible to perform laser processing with the laser irradiation head 3 in a healthy condition.

While various embodiments of the present invention have been described above, these embodiments are presented by way of example and there is no intention to thereby restrict the scope of the invention. Novel embodiments of these can be put into practice in various modified ways and various deletions, substitutions or alterations may be made within a scope not departing from the gist of the invention. Such embodiments and modifications thereof are included within the scope and gist of the invention and are included in the scope of the invention set out in the patent claims and equivalents thereof.

What is claimed is:

1. A laser irradiation device, comprising:
   (1) a laser oscillator configured to oscillate a laser beam;
   (2) a laser irradiation head configured to irradiate the laser beam oscillated with the laser oscillator onto a processing region; and
   (3) a laser transmitter configured to transmit the laser beam from the laser oscillator to the laser irradiation head,
   wherein said laser irradiation head comprises:
   (a) a protective window provided at an irradiation region where the irradiation head is configured to irradiate the laser beam therefrom;
   (b) a reflection optical element, provided in a path of the laser beam transmitted from the laser transmitter to the protective window, configured to pass through the laser beam and to reflect at least visible light;
   (c) an image pickup camera configured to capture the visible light reflected with the reflection optical element;
   (d) an image adjustment optical element, provided between the reflection optical element and the image pickup camera, configured to adjust a focal point of the image pickup camera to at least a first focal position of at the protective window and a second focal position of the processing region; and (e) a wavelength-dependent screen provided between the reflection optical element and the image pickup camera configured to remove a noise component included in the reflected light, wherein the reflection optical element is configured to set its position at 1) a first reflection position configured to reflect the visible light from the laser transmitter to the image pickup camera and 2) a second reflection position configured to reflect the visible light from the protective window to the image pickup camera.

2. The laser irradiation device according to claim 1,
wherein the reflection optical element comprises a dichroic mirror.

3. The laser irradiation device according to claim 1, further comprising:
   a storage configured to store a pre-processing image that is captured with the image pickup camera before the laser irradiation head irradiates the laser beam onto the processing region;
   a processor configured to compare a post-processing image, which is captured with the image pickup camera after the laser irradiation head irradiates the laser beam onto the processing region, with the pre-processing image.

4. The laser irradiation device according to claim 3,
wherein the processor is configured to process an amount of light contained in the pre-processing image and the post-processing image.

5. The laser irradiation device according to claim 3,
wherein the laser beam irradiated from the laser irradiation head comprises a processing laser beam configured to be irradiated for a processing on the processing region and a lower output laser beam of lower output than the processing laser beam configured to be irradiated for capturing at least one of the pre-processing image and the post-processing image.

6. A method of processing with a laser irradiation device which includes,
   (1) a laser oscillator configured to oscillate a laser beam;
   (2) a laser irradiation head configured to irradiate the laser beam oscillated with the laser oscillator onto a processing region, and
   (3) a laser transmitter configured to transmit the laser beam from the laser oscillator to the laser irradiation head,
wherein said laser irradiation head includes
   (a) a protective window provided at an irradiation region Where the irradiation head is configured to irradiate the laser beam therefrom,
   (b) a reflection optical element, provided in a path of the laser beam transmitted from the laser transmitter to the protective window, configured to pass through the laser beam and to reflect at least visible light,
   (c) an image pickup camera configured to capture the visible light reflected with the reflection optical element,
   (d) an image adjustment optical element, provided between the reflection optical element and the image pickup camera, configured to adjust a focal point of the image pickup camera to at least a first focal position of at the protective window and a second focal position of the processing region, and
   (e) a wavelength-dependent screen provided between the reflection optical element and the image pickup camera configured to remove a noise component included in the reflected light,
wherein the reflection optical element is configured to set its position at 1) a first reflection position configured to reflect the visible light from the laser transmitter to the image pickup camera and 2) a second reflection position configured to reflect the visible light from the protective window to the image pickup camera,
said method comprising:
oscillating the laser beam from the laser oscillator;
transmitting the laser beam from the laser oscillator to the laser irradiation head with the laser transmitter; and
irradiating the laser beam onto the processing region from the laser irradiation head.

* * * * *